United States Patent [19]
Hartmann et al.

[11] Patent Number: 5,961,016
[45] Date of Patent: Oct. 5, 1999

[54] ARTICLE GRIPPING APPARATUS

[76] Inventors: Jerome Hartmann, 5886 SE. 64th Ave., Carlisle, Iowa 50047; Thomas R. Steinhagen, 2504 Country Side Pl., West Des Moines, Iowa 50265

[21] Appl. No.: 08/963,005

[22] Filed: Nov. 3, 1997

[51] Int. Cl.[6] .................................................. B60R 11/02
[52] U.S. Cl. .................... 224/571; 224/552; 224/539; 224/929; 224/570; 248/316.4; 379/455
[58] Field of Search .................................. 224/247, 248, 224/441, 446, 495, 501, 539, 545, 548, 552, 554, 571, 929, 570; 248/223.41, 316.4, 316.6; 379/455; 455/90

[56] References Cited

U.S. PATENT DOCUMENTS

| | | | |
|---|---|---|---|
| D. 309,307 | 7/1990 | Sigurdson | D14/251 |
| D. 321,885 | 11/1991 | Sheldrake | D14/253 |
| D. 365,566 | 12/1995 | Cantrell | D14/253 |
| D. 365,567 | 12/1995 | Cantrell | D14/253 |
| D. 371,137 | 6/1996 | Kriegh | D14/253 |
| D. 379,463 | 5/1997 | Richter | D14/253 |
| 680,213 | 8/1901 | Baker et al. | 224/446 |
| 2,915,267 | 12/1959 | Kaysing | 248/316.6 |
| 3,964,612 | 6/1976 | Skilliter, Jr. et al. | 224/929 |
| 4,097,012 | 6/1978 | McIntyre | 224/552 |
| 4,248,340 | 2/1981 | Hild | 198/711 |
| 5,033,709 | 7/1991 | Yuen | 248/316.4 |
| 5,040,712 | 8/1991 | Pesonen et al. | 224/42.45 R |
| 5,060,260 | 10/1991 | O'Connell | 379/455 |
| 5,121,863 | 6/1992 | Kotitalo et al. | 224/42.45 R |
| 5,222,132 | 6/1993 | Rioux, Jr. | 379/455 |
| 5,305,381 | 4/1994 | Wang et al. | 379/455 |
| 5,367,570 | 11/1994 | Figueroa | 379/434 |
| 5,396,556 | 3/1995 | Chen | 379/446 |
| 5,414,770 | 5/1995 | Wang | 379/446 |
| 5,457,745 | 10/1995 | Wang | 379/455 |
| 5,568,549 | 10/1996 | Wang | 379/446 |
| 5,583,935 | 12/1996 | Dunchock | 379/454 |
| 5,588,055 | 12/1996 | Williamson et al. | 379/446 |
| 5,661,798 | 8/1997 | Chen | 379/454 |
| 5,697,071 | 12/1997 | Fan | 455/90 |

*Primary Examiner*—Gregory M. Vidovich
*Attorney, Agent, or Firm*—Dick and Harris

[57] ABSTRACT

An apparatus attachable to a vehicle surface for gripping an article including a base member, side panels, at least one finger member, an adjustment member, and an attachment member. The base member includes a top surface, a first side edge and a second side edge. The side panels extend upwardly from each of the first and second side edges. The at least one finger member is slidably attached to at least one of the side panels. The finger member includes an extension region extending at least partially toward the opposing side panel so that the extension region together with the base member and the side panels define an inner region that facilitates retention of an article therein. The adjustment member adjusts the distance between the extension region of the finger member and the top surface base member, to in turn, accommodate articles of varying thicknesses. The attachment means facilitates attachment of the apparatus to a vehicle surface.

17 Claims, 4 Drawing Sheets

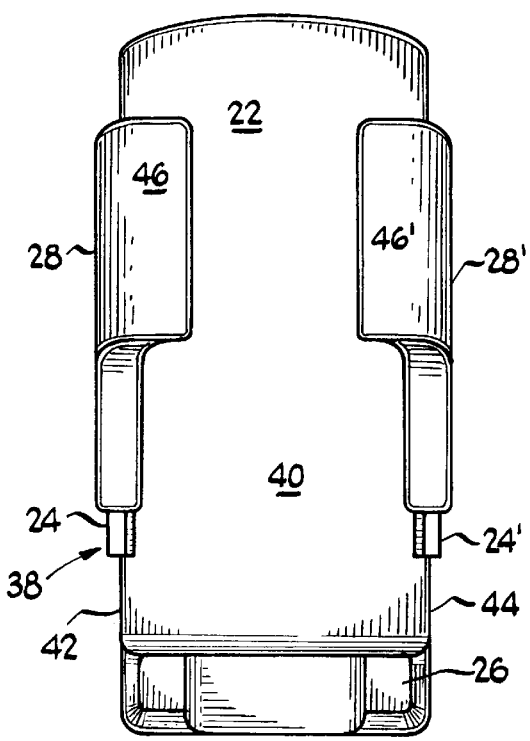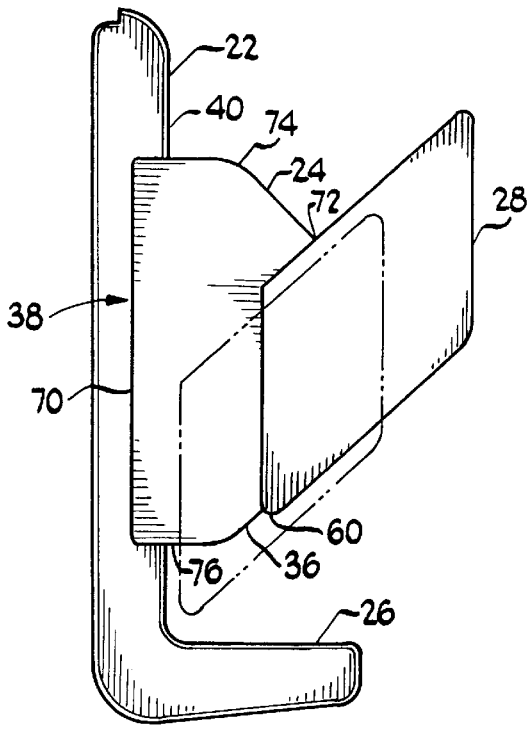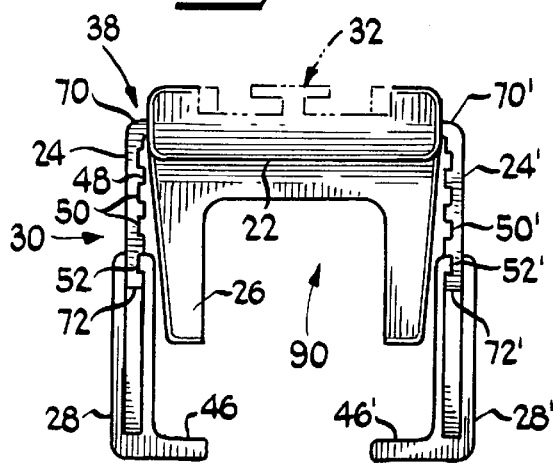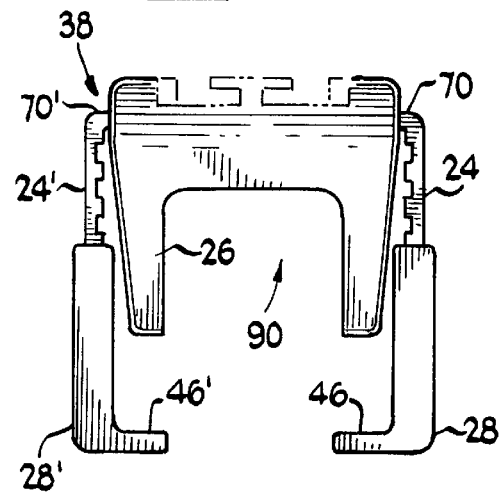

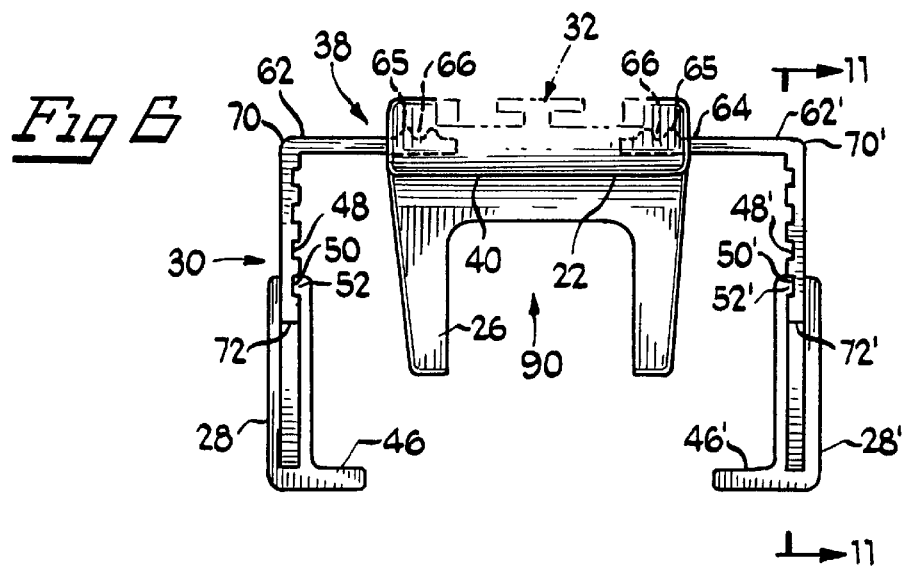
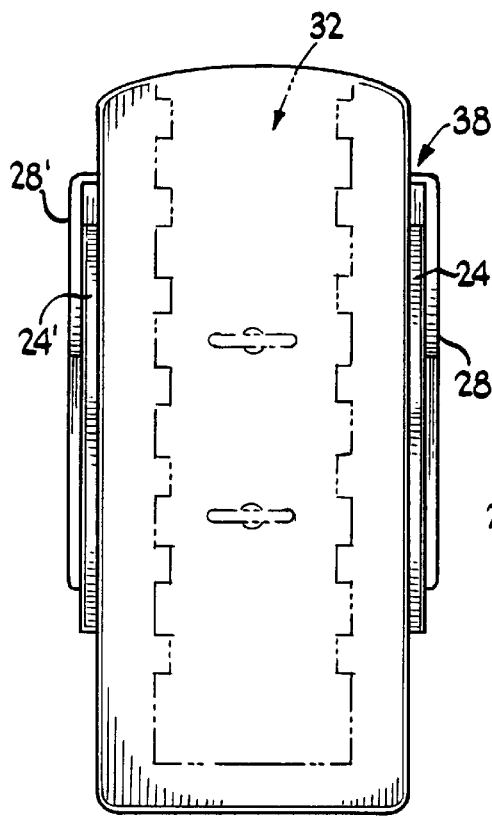
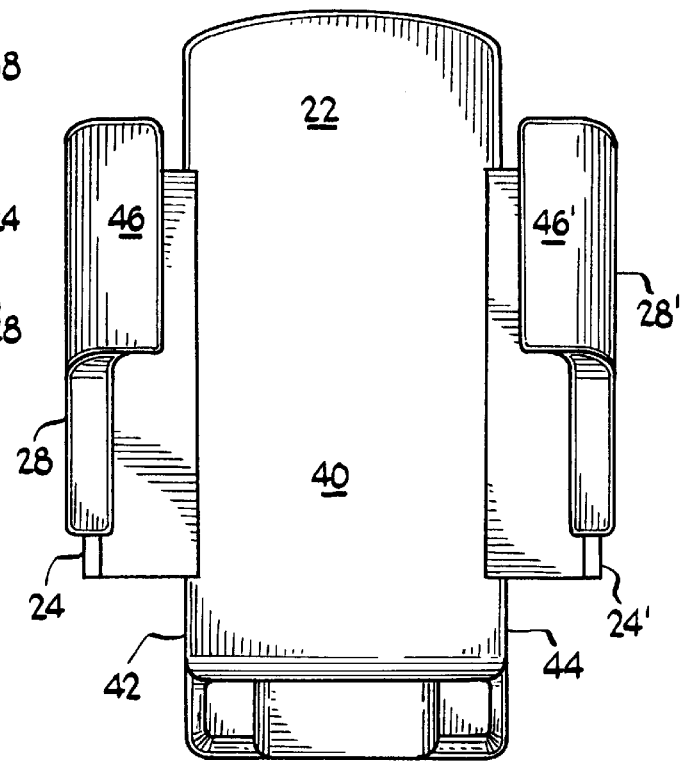

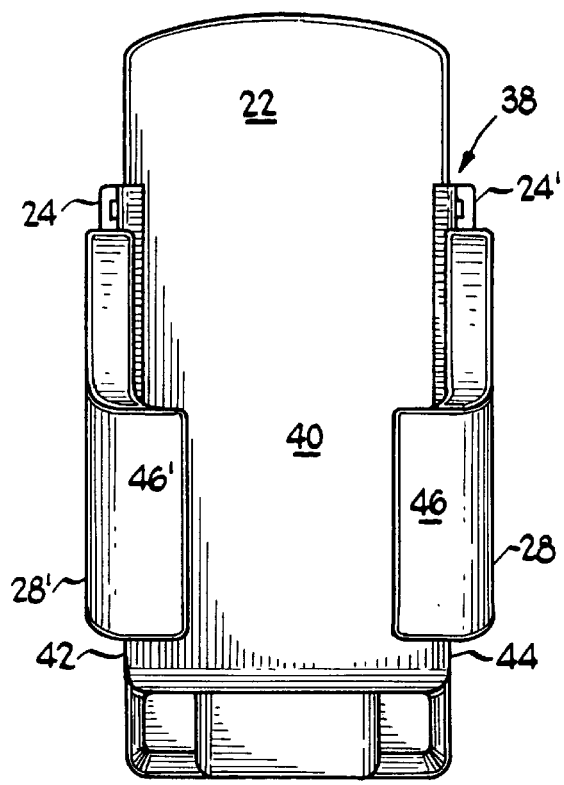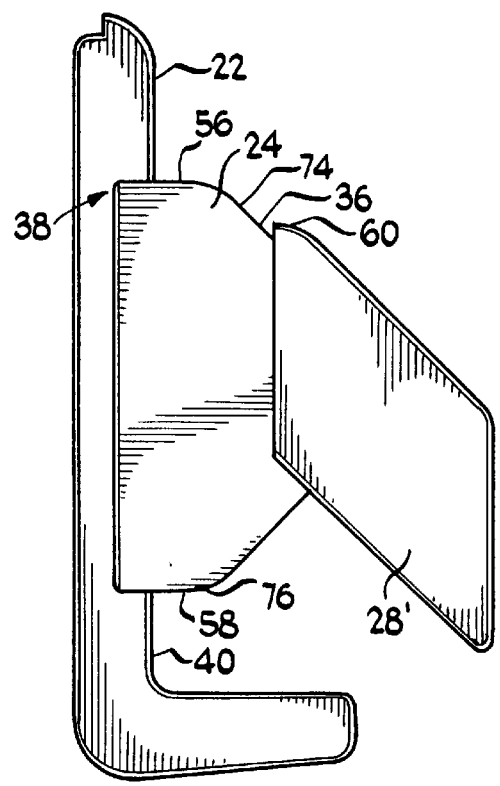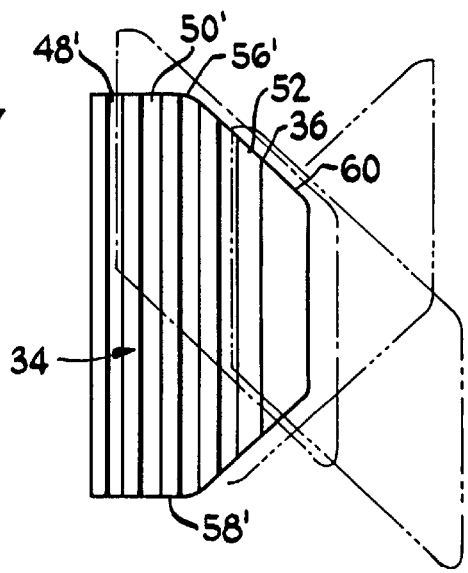

ARTICLE GRIPPING APPARATUS

BACKGROUND OF THE INVENTION

1. Field of the Invention

The invention relates in general to a gripping apparatus, and specifically to an apparatus attachable to a vehicle surface for gripping an article.

2. Background Art

Gripping devices have long been used to retain articles in a desired position. Recently, with the advent of automotive accessories, the use of devices in a vehicle has dramatically increased. For instance, one such accessory has been the cellular telephone. Initially, cellular telephones were introduced as devices which were retained in the vehicle. Specifically, in addition to the handset, the units included a base which was attached to the vehicle. Subsequently, the use of portable telephones surpassed the use of vehicle-based telephones.

The advent of the portable telephones, especially in vehicles, has brought upon several problems. For instance, generally users of portable telephones do not have the use of bases or holders in a vehicle. Thus, the telephone inevitably, due to bumps, vibrations and dynamics of driving, becomes lost under a seat or on the vehicle floor, away from the user. Where the user additionally is using a power cord, the power cord may obstruct certain vehicle controls due to the movement of the vehicle. As such, the portable telephone without a holder can become a hazard if the user is distracted by the foregoing situations.

Some holders have been developed that accommodate particular telephones, and provide for a stable position to which to attach the portable phone when not in use. However, due to rapid changes in technology, as well as the sheer number of models and styles of portable telephones that are available, it is certain that the holder will become obsolete within a few short years. As such, these holders must invariably be replaced with holders that accommodate newer telephones.

Other holder designs have been developed to accommodate portable telephones of varying sizes and styles. While these holders have the ability to adapt to differently sized telephones, certain problems have been associated with these designs. Firstly, the adjustment structures of these holders are often precise and delicate. Thus, the adjustments that are required are frequent and difficult. Second, the adjustment structures, while able to retain the portable telephone can obstruct the normal operation of the telephone. Further, some of the structures are quite complicated in that they lack the durability necessary for operating in extreme conditions.

SUMMARY OF THE INVENTION

The invention comprises an apparatus attachable to a vehicle surface for gripping an article. The apparatus comprises a base member, side panels, at least one finger member, adjusting means and attachment means. The base member includes a top surface, a first side edge and a second side edge. The side panels extend upwardly from each of the first and second side edges. The finger member is slidably attached to at least one of the side panels. The finger member including an extension region extending at least partially toward the opposing side panel. The extension region, together with the base member and side panels defining an inner region to facilitate retention of an article therein. The adjusting means is capable of adjusting the distance between the extension region of the finger member and the top surface of the base member, to, in turn, accommodate articles of varying thicknesses. The attachment means facilitates the attachment to a vehicle surface.

In a preferred embodiment, the adjustment means comprises at least two channel regions on the side panel and a mating channel region on the finger member. The channel regions are disposed about at least one side panel. One of the two channel regions is positioned in closer proximity to the base member than the other channel region. The mating channel region is disposed on the finger member and is capable of selectively engaging either of the at least two channel regions of the at least one side panel, to facilitate the positioning of the finger member and the extension region at at least two different distances relative to the top surface of the base member. In such an embodiment, the at least two channel regions are substantially parallel to the base member. Preferably the at least two channel regions comprise four channel regions.

In a preferred embodiment, the apparatus further includes means for positioning the at least one finger member in at least two distinct orientations on a side panel. In such an embodiment, the at least two channel regions each include a first end and a second end. The positioning means comprises the slidable engagement of the mating channel of the at least one finger member with the first end of either of the at least two channel regions defining a first orientation. The slidable engagement of the mating channel of the at least one finger member with the second end of either of the at least two channel regions defining a second orientation. In such an embodiment, the at least one finger member comprises at least two finger members. The at least two channel regions positioned on at least one of the side panels comprises at least two channel regions positioned on each of the side panels. Each of the two channel regions of each side panel includes a first end and a second end. The positioning means comprises the slidable engagement of the finger member with the first end of either of the at least two channel regions of the side panels defining a first orientation, and the slidable engagement of each finger member with the second end of either of the at least two channel regions of the side panels defines a second orientation.

In a preferred embodiment, the apparatus further includes means for limiting the slidable movement of the finger member relative to the side panel. In such an embodiment the limiting means comprises a terminating member associated with the mating channel of the at least one finger member. The terminating member precluding further slidable movement of the finger member relative to the side panel.

In a preferred embodiment, the apparatus further includes means for altering the distance between the side panels. This facilitates the accommodation of articles of varying width. In such an embodiment, the distance altering means comprises an extension member associated with at least one of the side panels. The extension region is slidably positionable relative to the base member. In such an embodiment, the apparatus further includes means for limiting the outward movement of the extension member relative to the base member. Further, in such an embodiment, the distance altering means further includes an indexing member associated with each of the base member and the extension member to permit the maintenance of the extension member in at least two predetermined indexed positions relative to the base member.

In a preferred embodiment, the at least one finger member comprises two finger members. Preferably, the two finger members comprise mirror images of each other.

In a preferred embodiment, the invention further includes a bottom member associated with at least one of the base member and the side panels. In such an embodiment, the bottom member further includes a recessed region thereon.

In a preferred embodiment the attachment means comprises a bracket, adhesive, suction cups, fasteners, clips and/or clamps. Preferably, the article comprises a portable telephone.

BRIEF DESCRIPTION OF THE DRAWINGS

FIG. 2 of the drawings is a front elevational view of the apparatus;

FIG. 3 of the drawings is a side elevational view of the apparatus;

FIG. 4 of the drawings is a top view of the apparatus;

FIG. 5 of the drawings is a bottom view of the apparatus;

FIG. 6 of the drawings is a top plan view of the apparatus in an alternate configuration;

FIG. 7 of the drawings is a back elevational view of the apparatus;

FIG. 8 of the drawings is a front elevational view of the apparatus in the configuration of FIG. 6;

FIG. 9 of the drawings is a front elevational view in an alternate orientation of the finger members;

FIG. 10 of the drawings is a side elevational view of the alternate orientation of the finger members; and FIG. 11 of the drawings is a cross-sectional view taken about lines 11—11 of FIG. 6.

DETAILED DESCRIPTION OF THE DRAWINGS

Figure 1:
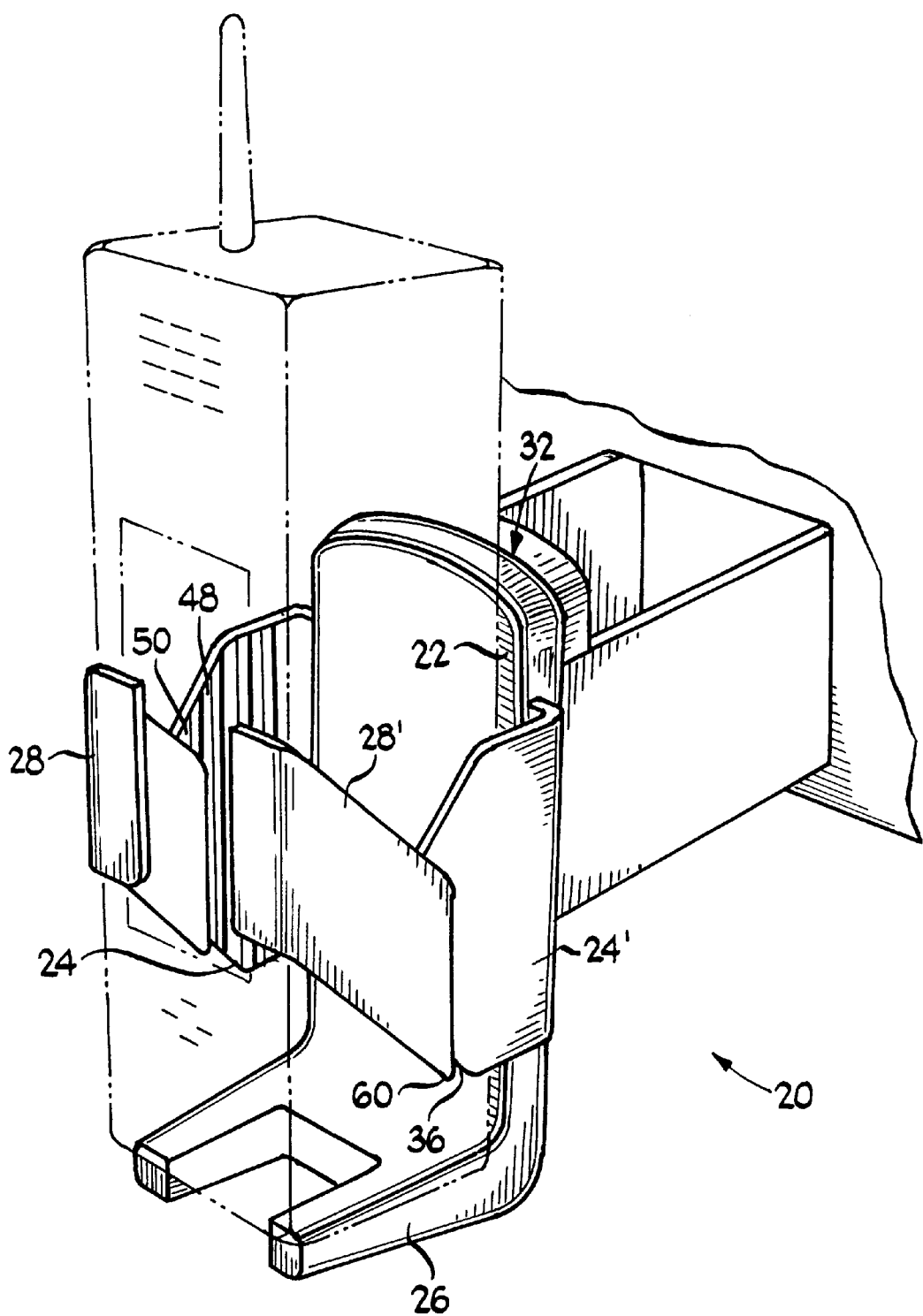
FIG. 1 of the drawings is a perspective view of the apparatus.

While this invention is susceptible of embodiment in many different forms, there is shown in the drawings and will herein be described in detail, one specific embodiment with the understanding that the present disclosure can be considered as an exemplification of the principles of the invention and is not intended to limit the invention to the embodiment illustrated.

Apparatus 20 is shown in FIGS. 1–10 as comprising base member 22, side panels 24, 24', bottom member 26, finger members 28, 28', means 30 for adjusting the finger members, means 32 for attaching the apparatus to a vehicle surface, and means 38 for altering the distance between the side panels. While reference is made to a vehicle surface, it will be understood that the apparatus may be used for any number of applications in locations other than the automobile, boat or watercraft, such as, for example, in the home or in the office.

Base member 22 is shown in FIGS. 2–10 as including top surface 40, first side edge 42, second side edge 44. The top surface is substantially planar and uniform, however, other configurations for accepting particular articles such as particular brands or types of cellular phones is likewise contemplated. The first and second side edges 42, 44 are substantially uniform and parallel, however, other configurations, for purposes of aesthetics or purposes of accepting particular articles having varying configurations are likewise contemplated. It is contemplated that the base member comprises a single molded plastic member, however, metals and other formation processes are likewise contemplated for use.

Side panels 24, 24' are shown in FIGS. 2–10. While side panel 24 will be explained in detail, it will be understood that side panel 24' is a substantial mirror image thereof. Side panel 24 includes proximal end 70, distal end 72, top edge 74, and bottom edge 76. Proximal end 70 is associated with first side edge 42 of base member 22. Distal end 72 is positioned opposite proximal end 70. Top edge 74 extends from proximal end 70 to distal end 72 along an upper end of the apparatus. Bottom edge extends from proximal end 70 to distal end 72 along a lower edge of the apparatus. While other configurations are contemplated, the top and the bottom edges of side panel 24 are mirror images of each other taken about a line bisecting proximal end 70. Of course, the particular configuration of each of the top, bottom, proximal and distal ends can vary with respect to particular applications and with respect to differing article designs.

Bottom member 26 is shown in FIGS. 2, 3 and 6 as extending from a lower region of base member 22. The bottom panel may include void 90 for permitting a cord or other protrusion to extend therethrough. As will be explained, the bottom panel further facilitates the retention of the article within the inner region of the apparatus. Indeed, while other configurations are contemplated, bottom panel is preferably integrally molded with base member 22. Additionally, for specific applications or specific articles, the bottom panel may further include additional retention structures (not shown).

Finger members 28, 28' are shown in FIGS. 1–11 as including extension region 46, 46', respectively. As will be understood, while finger member 28 will be explained in detail, it will be understood that finger member 28' is a substantial mirror image thereof. As will be explained, once finger member is slidably attached to side panel 24, extension region 46 extends between the two side panels, thereby defining an inner region capable of retaining an article therebetween.

Adjustment means 30 comprises at least two channel regions 48, 50, mating channel region 52, positioning means 34 and means 36 for limiting slidable movement of the finger member. Channel regions 48, 50 are positioned on side panel 24 and mating channel region 52 is disposed on finger member 28. It will be understood that side panel 24' includes channel regions 48', 50', and that finger member 28' includes mating channel region 52', all of which function much like the structures of side panel 24 and finger member 28. Channel regions 48, 50 are positioned in parallel to each other (and to the base member) about an inner surface of side panel 24.

Mating channel region 52 is disposed within finger member 28, and is configured to selectively engage either of the at least two channel regions 48, 50. As will be explained below, the engagement of the channel regions effectively changes the distance between the finger members and the base member, thus effectively adapting the inner region to accommodate articles of varying thicknesses.

Of course, the number of channel regions in each of the channel regions 48, 50 and mating channel region 52 can be varied, as well as the particular configuration and orientation of the channels with respect to each other and the base member. Moreover, the channel regions may extend about an outer surface of side panel 24, or they may extend over both the inner and outer surfaces thereof. Further, while the channels are shown to be of a square cross-section, other types of channels are certainly contemplated for use, as are other types of slidable engagements for slidably associating the finger member with respect to the base member.

Positioning means 34 as shown in FIG. 11 comprises the extension of channel region 48, 50 through from the top end to the bottom end of side panel 24, so that first end 56 of the channel regions abuts the top edge 74 of side panel 24, and second end 58 of the channel regions abuts the bottom edge 76 of side panel 24. As will be explained, by extending the channel regions, the mating channel region of each of the finger members can be inserted either from the top end of the side panel, or from the bottom end of the side panel. Additionally, either finger member 28, 28' may be positioned in any of four different orientations, namely, from the top or bottom edge of side panel 24 and from the top or bottom edge of side panel 24'. Of course it is contemplated that the channel regions of the side panels include breaks between the top end and the bottom end of the side panels, thereby creating two or more separate channel regions, namely those extending from the bottom edge of the side panel, and those extending from the top edge of the side panel.

Limiting means 36 is shown in FIGS. 1, 3, 10 and 11 as comprising terminating member 60 positioned on finger member 28. While terminating member 60 is shown in the drawings as comprising a closed end on finger member 28, mating channel. Indeed, once the mating channel region of the finger member and a channel region of the side panel engage and the finger member proceeds, along the channel region, depending on the point of insertion, one of the top and bottom edges of the side panels abut terminating member 60, thereby precluding continued movement along the channel in that first direction. Additionally, the tolerances between the mating channel regions can be such that a tight fit is achieved, which will further foster the positioning of the finger members and limit the relative movement of the finger members with respect to the side panels. Additional locking means may likewise be employed.

Distance altering means 38 is shown in FIGS. 2, 4 and 6 as comprising extension members 62, 62' (FIG. 6), outward limiting means 64, and indexing member 66. Extension members 62, 62' are associated with the respective proximal edges 70, 70' of the side panels and with the side edges 42, 44 of the base member. The extension members facilitate the extension or the retraction of the side panels, and in particular the distance between proximal end 70 and side edge 42, and the distance between proximal end 70' and side edge 44. Thus, articles of varying width can be accommodated. It should be noted that if desired only one extension member can be used between side panel 24 and base member 22, wherein side panel 24' may be rigidly positioned relative to the base member. Additionally, while it is contemplated that the extension members are integrally molded with the respective side panels, and slidably associated with the base member, other configurations are likewise contemplated.

Outward limiting means 64 limits the extension of the extension member relative to base member 22 so as to prevent inadvertent detachment of the extension member and the base member. Limiting means 64 comprises a protrusion 65 positioned on the extension member 62, 62' which cooperates with the base member 22 to prevent further slidable movement of the base member relative to the extension member. Indexing member 66 is associated with base member 22 and cooperates with protrusion member 65 of the outward limiting means 64 so as to releasably retain the protrusion member, and in turn, the extension member in at least two predetermined indexed positions.

Attaching means 32 comprises any number of different structures for attachment of the apparatus to an outside surface. Among others, the attachment structures may include adhesive, clamps, clips, fasteners, hook and loop fasteners, to name a few.

In operation, for effective use in association with a desired article, such as, for example, a cellular telephone, the apparatus must be configured to best accept and retain the particular structure. First, the user, through use of the distance altering means, adjusts side panels 24, 24' to accommodate the width of the cellular telephone. While not required, preferably, each side panel is moved the same amount with respect to the base member so that symmetry can be maintained.

Once the width has been accommodated, the user can next alter the finger members with respect to the side panels to accommodate the thickness of the cellular telephone. Specifically, mating channel 52 disposed on finger member 28 is positioned into the desired channel region 48, 50, so as to snugly retain the cellular telephone within the inner region. Next, finger member 28' is positioned into the corresponding desired channel region 48, 48' so as likewise retain the cellular telephone within the inner region.

In certain instances, depending on the particular cellular telephone (or other article), the positioning of the finger members, and in particular the extension region, can undesirably obstruct a region of the article. In such a situation, a user may reorient the finger members so as to remove the obstruction. For example, the user can change the position of the finger members from that which is shown in FIG. 3 to that which is shown in FIG. 10. To accomplish this change in orientation, the user first removes finger member 28 from slidable engagement about top edge 74 of side panel 24 and, instead, inserts finger member 28 into slidable engagement about bottom edge 76' of side panel 24'. In a similar manner, the user removes finger member 28' from slidable engagement about top edge 74' of side panel 24' and, instead, inserts finger member 28' into slidable engagement about bottom edge 76 of side panel 24. Thus, the relative position of the extension region has changed to in turn, remove the prior obstruction. Of course, the extension regions of the finger members may further be exaggerated in shape so that specific articles can be properly accommodated free of obstruction.

Once the proper width and thickness accommodations have been made for the article, the apparatus may be attached to an outside surface. Of course, the width and thickness accommodations can be made in either order and either prior to or after attachment of the apparatus to an outside surface.

The foregoing description and drawings merely explain and illustrate the invention and the invention is not limited thereto, as those skilled in the art who have the disclosure before them will be able to make modifications and variations therein without departing from the scope of the invention.

We claim:

1. An apparatus attachable to a vehicle surface for gripping an article comprising:

a base member having a top surface, a first side edge and a second side edge;

first and second side panels extending from each of the first and second side edges of the base member away from the top surface, the side panels each having an outer surface and inner surface:

each side panel including a plurality of channel regions, with each of the channel regions on each side panel being positioned at a different distance from the top surface of the base member than any other channel region on that same side panel, and each channel region on the first side panel being positioned at substantially the same distance from the top surface of the base member as a corresponding region on the second side panel, and wherein each of the side panels includes a top edge and a bottom edge;

first and second finger members selectively attachable to each side panel, each finger member including an extension region extending at least partially toward the opposing side panel, the extension regions together with the base member and the side panels defining an inner region to facilitate retention of an article therein;

each finger member further having at least one mating channel region capable of selectively and releasably engaging each of the side panel channel regions of one of the side panels from a selected one of the top edge or bottom edge and each of the side panel channel regions of the other side panel from the other one of the top or bottom edge, thus allowing adjustment of the distance between the extension regions of the finger members and the top surface of the base member to, in turn, accommodate articles of varying thickness, engagement of the at least one mating channel region of the first finger member with one of the plurality of the side panel channel regions of the first side panel, at a first selected distance from the top surface of the base member, from the top edge of the first side panel, and engagement of the at least one mating channel region of the second finger member with one of the plurality of the side panel channel regions of the second side panel, at a second selected distance from the top surface of the base member, from the top edge of the second side panel defines a first inner region, and engagement of the at least one mating channel region of the first finger member with one of the plurality of side panel channel regions of the second side panel, at the same selected second distance from the top surface of the base member, from the bottom edge of the second side panel, and engagement of the at least one mating channel region of the second finger member with one of the plurality of side panel channel regions of the first side panel, at the same first selected distance from the top surface of the base member, from the bottom edge of the first side panel defines a second inner region distinct from the first inner region; and means for attachment of the apparatus to a vehicle surface.

2. The apparatus according to claim 1 wherein the plurality of channel regions on each side panel are substantially parallel to the base member.

3. The apparatus according to claim 1 wherein each of the finger members further includes a terminating member associated with the mating channel region to limit slidable movement of the finger members relative to the respective side panels.

4. The apparatus according to claim 3 wherein the terminating member comprises a closed end on one end of the mating channel region of the finger members.

5. The apparatus according to claim 1 wherein each side panel further includes an extension member slidably positionable relative to the base member for altering the distance between the side panels to, in turn, accommodate articles of varying width.

6. The apparatus according to claim 5 further including a protrusion associated with each of the side panel extension members; and at least one indexing member associated with the base member such that the extension member protrusions and the at least one indexing member cooperate to permit the maintenance of each extension member in at least two predetermined indexed positions relative to the base member.

7. The apparatus according to claim 1 wherein the finger members comprise mirror images of each other.

8. The apparatus according to claim 1 further comprising a bottom member associated with at least one of the base member and the side panels.

9. The apparatus according to claim 8 wherein the bottom member further includes a recessed region thereon.

10. The apparatus according to claim 1 wherein at least two of the plurality of channel regions are positioned on the inner surface of at least one side panel.

11. The apparatus according to claim 1 wherein the extension regions on the finger members partially extend toward one another to leave a gap therebetween.

12. An apparatus attachable to a vehicle surface for gripping an article comprising:

a base member having a top surface, a first side edge and a second side edge;

side panels extending from each of the first and second side edges of the base member away from the top surface, the side panels each having an outer surface and inner surface;

each side panel including a plurality of channel regions, at least one of the plurality of channel regions on each side panel being positioned closer to the top surface of the base member than at least one other channel region on that same side panel;

a finger member attachable to each side panel, each finger member including an extension region extending at least partially toward the opposing side panel, the extension regions together with the base member and the side panels defining an inner region to facilitate retention of an article therein;

each finger member further having at least one mating channel region capable of selectively and releasably engaging any of the plurality of channel regions on the side panels, thus allowing adjustment of the distance between the extension regions of the finger members and the top surface of the base member to, in turn, accommodate articles of varying thickness;

means for attachment of the apparatus to a vehicle surface; and each of the finger members further including a terminating member associated with the mating channel region to limit slidable movement of the finger members relative to the respective side panels, the terminating member comprising a closed end on one end of the mating channel region of the finger members.

13. An apparatus attachable to a vehicle surface for gripping an article comprising:

a base member having a top surface, a first side edge and a second side edge;

first and second side panels extending from each of the first and second side edges of the base member, the side panels each having an outer surface and an inner surface;

the first and second side panels each including a plurality of channel regions, with each of the channel regions on each side panel being positioned at a different distance from the top surface of the base member than any other channel region on the same side panel, and wherein each of the side panels includes a too edge and a bottom edge;

a pair of first and second finger members, each selectively and releasably securable to one of the side panels;

each finger member including an extension region extending at least partially toward the opposing side panel, the extension regions together with the base member and the inner surface of the side panels defining an inner region to facilitate retention of an article therein;

each finger member further having at least one mating channel region capable of selectively, securably and releasably engaging each of the side panel channel regions of one of the side panels from a selected one of the tog edge or bottom edge and each of the side panel channel regions of the other side panel from the other of the top or bottom edge, thus allowing adjustment of the distance between the extension region of the finger member and the base member to, in turn, accommodate articles of varying thickness;

engagement of the at least one mating channel region of the first finger member with one of the plurality of the side panel channel regions of the first side panel, at a first selected distance from the top surface of the base member, from the top edge of the first side panel, and engagement of the at least one mating channel region of the second finger member with one of the plurality of the side panel channel regions of the second side panel, at a second selected distance from the top surface of the base member, from the top edge of the second side panel defines a first inner region, and engagement of the at least one mating channel region of the first finger member with one of the plurality of side panel channel regions of the second side panel, at the same selected second distance from the top surface of the base member, from the bottom edge of the second side panel, and engagement of the at least one mating channel region of the second finger member with one of the plurality of side panel channel regions of the first side panel, at the same first selected distance from the top surface of the base member, from the bottom edge of the first side panel defines a second inner region distinct from the first inner region;

at least one side panel further including an extension member slidably positionable relative to the base member for altering the distance between the side panels to, in turn, accommodate articles of varying width; and means for attachment of the apparatus to a vehicle surface.

14. The apparatus according to claim 13 further comprising:

a protrusion associated with the at least one side panel extension member; and at least one indexing member associated with the base member such that the extension member protrusion and the at least one indexing member cooperate to permit the maintenance of the at least one extension member in at least two predetermined indexed positions relative to the base member.

15. The apparatus according to claim 13 wherein the extension region on each finger member extends only a portion of the distance between the two side panels.

16. The apparatus according to claim 13 wherein each finger member further includes a terminating member associated with the mating channel region to limit slidable movement of the finger member relative to the respective side panels.

17. The apparatus according to claim 13 wherein at least two of the plurality of channel regions are positioned on the inner surface of each side panel.

\* \* \* \* \*

UNITED STATES PATENT AND TRADEMARK OFFICE
CERTIFICATE OF CORRECTION

PATENT NO : 5,961,016
DATED : October 5, 1999
INVENTOR(S) : Jerome Hartmann and Thomas R. Steinhagen It is certified that error appears in the above-identified patent and that said Letters Patent are hereby corrected as shown below:

Column 8, Line 66          Delete "too" and insert --top--

Column 9, Line 12          Delete "tog" and insert --top--

Signed and Sealed this

Seventeenth Day of April, 2001

Attest:

NICHOLAS P. GODICI

Attesting Officer          Acting Director of the United States Patent and Trademark Office